(12) United States Patent
Thangapandi et al.

(10) Patent No.: US 12,231,405 B2
(45) Date of Patent: Feb. 18, 2025

(54) SELECTING A VPN CONNECTION USING NEGOTIATED CRYPTOGRAPHIC ALGORITHMS TO IMPROVE THROUGHPUT

(71) Applicant: MICROSOFT TECHNOLOGY LICENSING, LLC, Redmond, WA (US)

(72) Inventors: Shivakumar Thangapandi, Redmond, WA (US); Abhishek Gupta, Redmond, WA (US); Vikrant Arora, Redmond, WA (US); Arun Venkatachalam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 445 days.

(21) Appl. No.: 17/518,382

(22) Filed: Nov. 3, 2021

(65) Prior Publication Data
US 2022/0385637 A1     Dec. 1, 2022

Related U.S. Application Data

(63) Continuation-in-part of application No. 17/332,752, filed on May 27, 2021, now Pat. No. 11,477,176.

(51) Int. Cl.
*H04L 9/40* (2022.01)
(52) U.S. Cl.
CPC ...... *H04L 63/0272* (2013.01); *H04L 63/0485* (2013.01)
(58) Field of Classification Search
CPC ............. H04L 63/0272; H04L 63/0485; H04L 63/164; H04L 63/04; H04L 45/70; H04L 45/745; H04L 47/12
See application file for complete search history.

(56) References Cited

U.S. PATENT DOCUMENTS 8,260,922 B1   9/2012  Aggarwal et al.
10,601,779 B1   3/2020  Matthews et al.
(Continued)

FOREIGN PATENT DOCUMENTS

CN    110572321 A    12/2019
KR    100471790 B1    3/2005
(Continued)

OTHER PUBLICATIONS

Zaharuddin et al. (2010) Technical Comparison Analysis of Encryption Algorithm on Site-to-Site IPSec VPN; 2010 International Conference on Computer Applications and Industrial Electronics (ICCAIE 2010), Dec. 5-7, 2010 (Year: 2010).*
(Continued)

*Primary Examiner* — Brian F Shaw
(74) *Attorney, Agent, or Firm* — Newport IP, LLC; Jacob P. Rohwer

(57) ABSTRACT

A virtual private network (VPN) gateway selects a VPN connection, from multiple VPN connections established between a network VPN gateway and a remote VPN gateway, based on performance factors such as throughput. A system may measure throughput in megabytes per second (Mbps). More specifically, a VPN gateway (e.g., a remote VPN gateway or a network VPN gateway) can configure a routing preference that selects a VPN connection that is more performant based on a cryptographic algorithm that is used for the VPN connection. The VPN gateway can update the routing preference to select an alternative VPN connection when the performance of the VPN connection suffers.

20 Claims, 9 Drawing Sheets

(56) References Cited

U.S. PATENT DOCUMENTS

| | | | |
|---|---|---|---|
| 10,721,096 B2 | 7/2020 | Abraham | |
| 2004/0039936 A1 | 2/2004 | Lai | |
| 2004/0117653 A1 | 6/2004 | Shapira et al. | |
| 2004/0120257 A1 | 6/2004 | Uttaro | |
| 2006/0002388 A1 | 1/2006 | Grebus et al. | |
| 2013/0064198 A1* | 3/2013 | Krishnaswamy | H04W 76/15 370/329 |
| 2013/0318345 A1* | 11/2013 | Hengeveld | H04L 45/22 713/168 |
| 2016/0020922 A1* | 1/2016 | Sung | H04L 61/5007 370/329 |
| 2016/0363976 A1 | 12/2016 | Gatson et al. | |
| 2019/0173850 A1 | 6/2019 | Jain et al. | |
| 2019/0173851 A1 | 6/2019 | Jain | |
| 2019/0173920 A1 | 6/2019 | Gopal et al. | |
| 2021/0021523 A1* | 1/2021 | Wang | H04L 63/0272 |

FOREIGN PATENT DOCUMENTS

| | | |
|---|---|---|
| KR | 100506182 B1 | 8/2005 |
| WO | 2019209506 A1 | 10/2019 |
| WO | 2020134413 A1 | 7/2020 |

OTHER PUBLICATIONS

"Notice of Allowance Issued in U.S. Appl. No. 17/332,752", Mailed Date: Jun. 10, 2022, 9 Pages.

"International Search Report and Written Opinion Issued in PCT Application No. PCT/US22/027190", Mailed Date: Aug. 12, 2022, 17 Pages.

"International Search Report and Written Opinion Issued in PCT Application No. PCT/US22/027195", Mailed Date: Jul. 29, 2022, 13 Pages.

"Load Balancing Algorithms, Types and Techniques", Retrieved From: https://web.archive.org/web/20210818175415/https:/kemptechnologies.com/load-balancer/load-balancing-algorithms-techniques/, Aug. 18, 2021, 8 Pages.

Non-Final Office Action mailed on Dec. 7, 2023, in U.S. Appl. No. 17/946,956, 27 pages.

Non-Final Office action mailed on Sep. 3, 2024, in U.S. Appl. No. 17/946,956, 25 pages.

Notice of Allowance mailed on Dec. 20, 2024, in U.S. Appl. No. 17/946,956 11 pages.

* cited by examiner

| | Security Association Table 200 | |
|---|---|---|
| 202 — Inbound SA 130 | SPI 130 (0x808080808) | Processing Core 124(3) |
| 204 — Inbound SA 132 | SPI 132 (0x60606060) | Processing Core 124(4) |
| 206 — Outbound SA 126 (Selector 210 – 0.0.0.0/1) | SPI 126 (0x90909090) | Processing Core 124(1) |
| 208 — Outbound SA 128 (Selector 212 – 128.0.0.0/1) | SPI 128 (0x70707070) | Processing Core 124(2) |

FIG. 2

SELECTING A VPN CONNECTION USING NEGOTIATED CRYPTOGRAPHIC ALGORITHMS TO IMPROVE THROUGHPUT

PRIORITY APPLICATION(S)

This U.S. Non-Provisional Application is a Continuation-In-Part Application that claims benefit of and priority to U.S. Non-Provisional application Ser. No. 17/332,752, filed May 27, 2021, entitled "IMPROVING THROUGHPUT FOR A SINGLE VPN CONNECTION USING MULTIPLE PROCESSING CORES", the entire contents of which are incorporated herein by reference.

BACKGROUND

A virtual private network (VPN) implements various technologies that exchange data, typically Internet Protocol data, via another network so that users can remotely access network resources in a secure manner. In other words, these network resources may otherwise be inaccessible via public Internet. VPNs are frequently used in the information technology sector to provide secure access to resources for users that are not physically connected to an organization's network. In many situations, these users are telecommuting workers or employees.

Conventionally, a remote VPN client or a remote VPN gateway (e.g., one or more devices configured in a remote or on-premises network) can access network resources via a network VPN gateway. A network VPN gateway is an intermediate system tasked with sending data traffic between the network resources and a remote location (e.g., a home network, an on-premises network, an enterprise network, etc.) over the public Internet. Consequently, the remote VPN client or the remote VPN gateway typically comprises one or more remote devices (e.g., an on-premises device, a home device, a work device, etc.) and the network VPN gateway is configured by a service (e.g., cloud) provider to enable secure access to the network resources (e.g., virtual networks, virtual machines, servers, etc.), which are configured behind the network VPN gateway.

A network VPN gateway typically consists of multiple VPN server instances. A VPN server instance is typically responsible for decrypting inbound data and passing the inbound data off to resources on the network side (e.g., applications executing via a virtual network and/or on a virtual machine). The VPN server instance may also encrypt outbound data and send the outbound data from the network resources to the remote VPN client or the remote VPN gateway.

Typically, multiple VPN connections, which may be referred to as a VPN "tunnels", are established between a remote VPN gateway and a network VPN gateway. These VPN connections are configured to negotiate the use of different cryptographic algorithms. A VPN gateway selects a VPN connection, from the multiple VPN connections, using a round robin approach. That is, the VPN gateway may select a first VPN connection, according to an order and regardless of the cryptographic algorithm used, for a first data flow to be exchanged between the remote VPN gateway and the network VPN gateway. The VPN gateway then selects a second VPN connection, according to an order and regardless of the cryptographic algorithm used, for a second data flow to be exchanged between the remote VPN gateway and the network VPN gateway. This round robin approach is implemented to attempt to balance the load across the VPN connections established between the remote VPN gateway and the network VPN gateway. However, selecting a VPN connection via the aforementioned round robin fashion does not provide the best network performance.

SUMMARY

The techniques disclosed herein enable a virtual private network (VPN) gateway to select a VPN connection, from multiple VPN connections established between a network VPN gateway and a remote VPN gateway, based on performance factors such as throughput. A system may measure throughput in megabytes per second (Mbps). More specifically, a VPN gateway (e.g., a remote VPN gateway or a network VPN gateway) can configure a routing preference that selects a VPN connection that is more performant based on a cryptographic algorithm that is used for the VPN connection.

As discussed herein, different cryptographic algorithms have different impacts on the throughput provided by VPN connections. A network VPN gateway assigns different cryptographic algorithms to the multiple VPN connections established between the network VPN gateway and a remote VPN gateway. In one example, there are four VPN connections established between the network VPN gateway and the remote VPN gateway—a first VPN connection that uses a highly performant cryptographic algorithm (e.g., GCMAES256—that provides throughput at ~650 Mbps), a second VPN connection that uses a less-performant cryptographic algorithm (e.g., AES256 & SHA256—that provides throughput at ~500 Mbps) compared to the one used by the first VPN connection, a third VPN connection that uses an even less-performant cryptographic algorithm (e.g., DES3 & SHA256—that provides throughput at ~120 Mbps) compared to the ones used by the first VPN connection and the second VPN connection, and a fourth VPN connection that uses no encryption (e.g., a cryptographic algorithm is not used because data transferred over this VPN tunnel is required to be already encrypted). Looking at the examples provide above, the AES256 & SHA256 cryptographic algorithm and the DES3 & SHA256 cryptographic algorithm require more CPU cycles compared to the GCMAES256 cryptographic algorithm, and these extra CPU cycles have a negative effect on the throughput provided by a VPN connection.

Using the example from the previous paragraph, a VPN gateway can configure a routing preference that selects, for a data flow to be exchanged, the first VPN connection because it uses a cryptographic algorithm that provides the best performance with respect to throughput. In various examples, this routing preference is valid as long as the first VPN connection is not overloaded and suffering from performance issues. For example, a performance issue may arise if a latency measurement is above a pre-established threshold latency value. In another example, a performance issue may arise if a packet loss measurement is above a pre-established threshold packet loss value. In yet another example, a performance issue may arise if a jitter measurement is above a pre-established threshold jitter value. Each of latency, packet loss, and jitter can affect the throughput of a VPN connection. To this end, the VPN gateway may also monitor and measure the throughput itself to determine that a performance issue has arisen when a throughput measurement is above a pre-established threshold throughput value.

If the performance of the preferred VPN connection, e.g., the one with the highest throughput due to the cryptographic algorithm used, is affected due to the amount of data traffic being communicated or other reasons, then the VPN gateway can change the routing preference to route new data flows to the other VPN connections that use less performant cryptographic algorithms. Consequently, the VPN gateways are configured to monitor the performance of the VPN connections, particularly the highest performant one, to ensure that it is acceptable to continue to route new data flows.

To help avoid overload situations, data packets (e.g., headers) of a data flow can be examined to determine if the data packets are already encrypted. If the data packets are already encrypted, another routing preference can route the encrypted data flow to a VPN connection that performs no further encryption. This will further increase the throughput.

The techniques disclosed herein provide a number of features that improve existing computing devices (e.g., servers). For instance, computational efficiency and throughput for data flows communicated over a VPN connection is improved. Other technical benefits not specifically mentioned herein can also be realized through implementations of the disclosed subject matter.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 2 illustrates an example security association table used by the VPN gateway to route a data packet to a processing core.

DETAILED DESCRIPTION

Described herein is a system that enables a virtual private network (VPN) gateway to select a VPN connection, from multiple VPN connections established between a network VPN gateway and a remote VPN gateway, based on performance factors such as throughput. A system may measure throughput in megabytes per second (Mbps). More specifically, a VPN gateway (e.g., a remote VPN gateway or a network VPN gateway) can configure a routing preference that selects a VPN connection that is more performant based on a cryptographic algorithm that is used for the VPN connection.

The techniques disclosed herein provide a number of features that improve existing computing devices (e.g., servers). For instance, computational efficiency and throughput for data flows communicated over a VPN connection is improved. Other technical benefits not specifically mentioned herein can also be realized through implementations of the disclosed subject matter.

Figure 1:
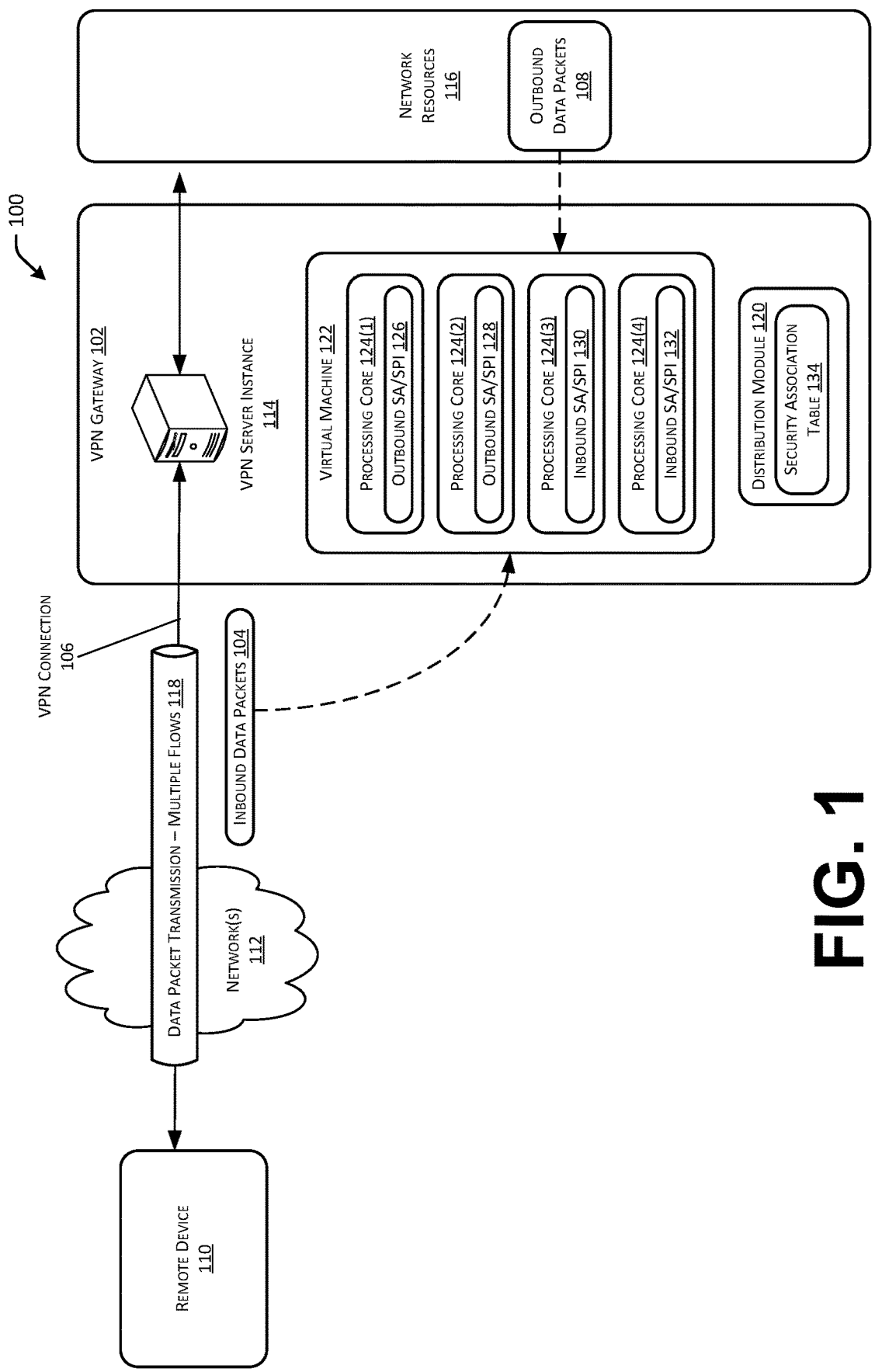
FIG. 1 illustrates an example environment in which a VPN gateway can distribute (i) inbound data packets from a single VPN connection across multiple processing cores and (ii) outbound data packets for the single VPN connection across multiple processing cores.

FIG. 1 illustrates an example environment 100 in which a VPN gateway 102 can distribute (i) inbound data packets 104 (e.g., ESP data packets) communicated over a single VPN connection 106 across multiple processing cores and (ii) outbound data packets 108 (e.g., TCP data packet, UDP data packet, ICMP data packet, etc.) to be communicated over the single VPN connection 106 across multiple processing cores. The VPN gateway 102 is configured to establish the VPN connection 106 with a remote device 110 over various network(s) 112.

The VPN gateway 102 includes a VPN server instance 114, also referred to as a physical "host" or "machine", that is part of a group of VPN server instances that are tasked with decrypting inbound data (e.g., inbound data packets 104) and passing the inbound data off to network resources 116 on the network side. In one example, these network resources 116 can include applications executing via a virtual network and/or on a virtual machine. The VPN server instances are also tasked with encrypting outbound data (e.g., outbound data packets 108), which originate in the network resources 116, and sending the outbound data to remote devices (e.g., remote device 110) over various VPN connections (e.g., VPN connection 106). The remote devices may then decrypt the outbound data packets and route the data packets to destinations within a remote network. Consequently, the VPN gateway 102 is an intermediate system tasked with securing and sending data traffic between network resources 116, configured behind the VPN gateway 102, and remote devices. Furthermore, a VPN connection 106 enables data packet transmission for multiple data flows 118 (e.g., data packets exchanged between two applications executing on two different endpoint devices). Consequently, the VPN connection 106 may alternatively be referred to as a VPN tunnel.

The VPN gateway 102 includes a distribution module 120 that is configured to allocate VPN gateway resources for encrypting and decrypting data communicated over the VPN connection 106. In one example, the distribution module 120 allocates a virtual machine 122 to the VPN connection 106. Further, the distribution module 120 is configured to determine a number of available processing cores to encrypt the outbound data packets and/or to decrypt the inbound data packets for a single VPN connection. A processing core may be available at a given time if it is not being used or if it is operating at a capacity level (e.g., 50%) below a threshold capacity level (e.g., 95%) that is known to have a negative effect on throughput. Accordingly, the distribution module 120 can be configured to monitor the operating capacities of the processing cores in the VPN server instance 114 and use the monitored operating capacities to allocate available processing cores to the virtual machine 122.

As shown in FIG. 1, the virtual machine 122 securing the data communications for the VPN connection 106 includes four available processing cores 124(1-4). While FIG. 1 illustrates that four processing cores are available, it is understood in the context of this disclosure, that more or less than four processing cores may be available. Typically, the processing cores allocated to the virtual machine 122 are all part of the same VPN server instance 114, but the number of processing cores allocated may not comprise all the processing cores of the VPN server instance 114 (e.g., multiple different virtual machines may be configured on the single VPN server instance 114).

The distribution module 120 is configured to divide the processing cores 124(1-4) into a first set (e.g., two or more) of processing cores 124(1), 124(2) to encrypt the outbound data packets 108 and a second set (e.g., two or more) of processing cores 124(3), 124(4) to decrypt the inbound data packets 104. This enables the encryption or decryption of directional traffic for the VPN connection 106 to be split amongst multiple processing cores, thereby improving the throughput. Consequently, a total number of available processing cores can be divided into two sets so that a number of processing cores for encryption and a number of processing cores for decryption can be determined. In some examples, the numbers for encryption and decryption are the same.

The distribution module 120 also creates multiple outbound SAs for the VPN connection 106 based on a number of processing cores in the first set and assigns an outbound SA to a processing core (e.g., binds an SA to a dedicated processing core). The distribution module 120 is configured to assign an SPI identifier to each of the outbound SAs. Accordingly, as shown in FIG. 1, processing core 124(1) is associated with a first outbound SA/SPI pair 126 and processing core 124(2) is associated with a second outbound SA/SPI pair 128.

Continuing this approach, the distribution module 120 creates multiple inbound SAs for the VPN connection 106 based on a number of processing cores in the second set and assigns an inbound SA to a processing core. The distribution module 120 is configured to assign an SPI identifier to each of the inbound SAs. Accordingly, as further shown in FIG. 1, processing core 124(3) is associated with a first inbound SA/SPI pair 130 and processing core 124(4) is associated with a second inbound SA/SPI pair 132.

The number of SAs and processing cores to be used for the inbound and the outbound data packets can be configurable and/or scaled based on the availability of processing cores and/or other factors. In one example, the VPN gateway 102 decides to use all the available processing cores in a virtual machine 122 to encrypt and to decrypt data packets communicated over a single VPN connection 106. In other examples, a decision can be made to use less than all the available processing cores when considering other factors.

Now each available processing core 124(1-4) to be used for encryption and decryption is associated with an SA and an SPI identifier. The SPI identifier is a value (e.g., a 32-bit value) that identifies an SA and differentiates the SA from other SAs. These associations are reflected in different entries of a security association table 134 created by the distribution module 120 on behalf of the virtual machine 122 and the VPN connection 106. The security association table 134 maps SA/SPI pairs to their dedicated processing cores, and these mappings can be referenced via the security association table 134 when routing a data packet for processing.

FIG. 2 illustrates an example security association table 200 (e.g., security association table 134) used by the distribution module 120 of the VPN gateway 102 to route a data packet to a processing core. The security association table 200 includes a first entry 202 that maps the first inbound SA 130 and its SPI identifier 130 (from FIG. 1) to processing core 124(3). The SPI identifier 130 in this first entry 202 is "0x80808080". The security association table 200 includes a second entry 204 that maps the second inbound SA 132 and its SPI identifier 132 (from FIG. 1) to processing core 124(4). The SPI identifier 132 in this second entry 204 is "0x60606060". The security association table 200 includes a third entry 206 that maps the first outbound SA 126 and its SPI identifier 126 to processing core 124(1). The SPI identifier 126 in this third entry 206 is "0x90909090". Finally, the security association table 200 includes a fourth entry 208 that maps the second outbound SA 128 and its SPI identifier 128 to processing core 124(2). The SPI identifier 128 in this third entry 206 is "0x70707070".

The distribution module 120 must ensure that the appropriate routing decision, for encryption purposes, is made for outbound data packets. As described above, outbound data packets are ones that originate in the network resources 116 and ones that need to be encrypted when received by the VPN gateway 102. Part of this encryption process includes adding an SPI identifier (e.g., "0x90909090" or "0x70707070") to the outbound data packet before it is communicated over the VPN connection 106. Consequently, when received by the VPN gateway 102, an outbound data packet 108 is a type that does not yet have an SPI identifier (e.g., a TCP data packet, a UDP data packet, an ICMP data packet).

To ensure an outbound data packet 108 is routed to the correct processing core, the distribution module 120 is configured to assign a traffic selector to each of the outbound SAs 126, 128. The traffic selector identifies a part of the destination IP subnet being used by the remote device 110, as well as a source IP subnet or part of a source IP subnet being used by the network resources 116. Accordingly, a traffic selector identifies mappings between source and destination IP subnets, and enables the selection of an outbound SA based on these mappings. For an individual source IP subnet or a part of a source IP subnet, the distribution module 120 is configured to divide a destination IP subnet into multiple non-overlapping parts, or IP address ranges, and assign an individual part of the destination IP subnet to an individual outbound SA. These traffic selectors are added to the security association table 200 and used to balance the outbound load across the processing cores 124(1), 124(2) tasked with encrypting outbound data packets for the VPN connection 106. In various examples, the traffic selectors create equal size parts (e.g., the same number of IP addresses to be included in each part).

As shown in FIG. 2, if the destination IP subnet for the remote device 110 is "0.0.0.0", the distribution module 120 can assign a first traffic selector 210 to the first outbound SA 126 (e.g., the part of the destination IP subnet covered by "0.0.0.0/1"). Similarly, the distribution module 120 can assign a second traffic selector 212 to the second outbound SA 128 (e.g., the part of the destination IP subnet covered by "128.0.0.0/1"). The traffic selectors 210, 212 divide the destination IP subnet into two parts, and these parts are mapped to same source IP address(es) (e.g., used by the network resources 116 that generate the outbound data packets).

Figure 3:
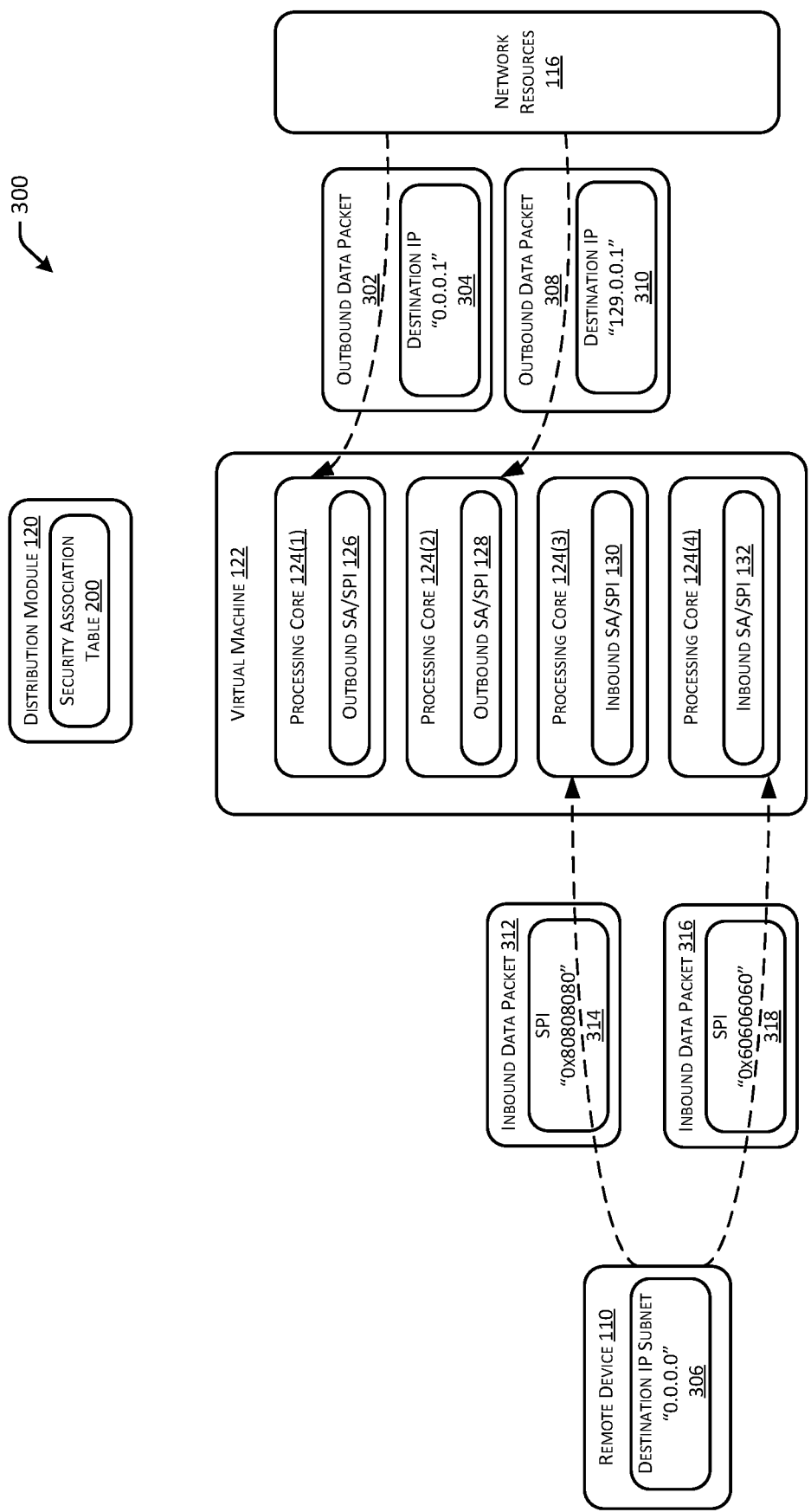
FIG. 3 illustrates an example environment in which a data packet is routed by the VPN gateway using a security association table.

FIG. 3 illustrates an example environment 300 in which a data packet is routed by the VPN gateway 102 (e.g., the distribution module 120) using the security association table 200 from FIG. 2. When the network resources 116 route an outbound data packet to the VPN gateway 102, a header that specifies a destination IP address is included. As shown in FIG. 3, a first outbound data packet 302 includes a header that specifies a destination IP address 304 of "0.0.0.1". The distribution module 120 is configured to obtain this destination IP address 304 of "0.0.0.1" from the outbound data packet 302 and select outbound SA 126 by associating, or matching, the destination IP address 304 of "0.0.0.1" with a corresponding part (e.g., "0.0.0.0/1") of the destination IP subnet 306 (e.g., "0.0.0.0") of the remote device 110. This part (e.g., "0.0.0.0/1") of the destination IP subnet 306 is identified via the traffic selector 210 assigned to outbound SA 126.

Similarly, FIG. 3 illustrates a second outbound data packet 308 that includes a header that specifies a destination IP address 310 of "129.0.0.1". The distribution module 120 is configured to obtain this destination IP address 310 of "129.0.0.1" from the outbound data packet 308 and select outbound SA 128 by associating, or matching, the destination IP address 310 of "129.0.0.1" with a corresponding part (e.g., "128.0.0.1") of the destination IP subnet 306 (e.g., "0.0.0.0") of the remote device 110. This part (e.g., "128.0.0.1") of the destination IP subnet 306 is identified via the traffic selector 212 assigned to outbound SA 128. Consequently, the traffic selectors 210, 212 enable efficient selection of outbound SAs (e.g., may be referred to as quick mode (QM) SAs) for a single VPN connection 106.

Using the security association table 200, the distribution module 120 can identify the processing cores that are bound to the selected outbound SAs. That is, as shown in FIG. 3, the distribution module 120 routes outbound data packet 302 to processing core 124(1) based on the selected outbound SA 126 and routes outbound data packet 308 to processing core 124(2) based on the selected outbound SA 128. As described above, these processing cores 124(1) and 124(2) encrypt the outbound data packets 302, 308, to be communicated to the remote device 110 over the same VPN connection 106, in accordance with IPsec. Accordingly, the SPI identifier "0x90909090" is added to outbound data packet 302 and the SPI identifier "0x70707070" is added to outbound data packet 308. In other words, the outbound data packets are transformed from one type of data packet to a more secure type of data packet (e.g., an ESP data packet).

When an inbound data packet arrives at the VPN gateway 102 from the remote device 110 for decryption, the inbound data packet includes a header (e.g., an ESP header) that specifies an SPI identifier based on the encryption that occurs via a VPN client operating on the remote device 110. As shown in FIG. 3, inbound data packet 312 includes a header with SPI 314 "0x80808080" and inbound data packet 316 includes a header with SPI 318 "0x60606060". Accordingly, the distribution module 120 is configured to match the SPI identifiers in the header of the inbound data packets 312, 316 with an SPI identifier in the security association table 200. More specifically, the distribution module 120 matches SPI 314 "0x80808080" with entry 202 in the security association table 200 to select the first inbound SA 130 for the inbound data packet 312. Similarly, the distribution module 120 matches SPI 318 "0x60606060" with entry 204 in the security association table 200 to select the second inbound SA 132 for the inbound data packet 316.

The distribution module 120 can then use the security association table 200 to identify the processing cores that are bound to the selected inbound SAs. That is, as shown in FIG. 3, the distribution module 120 routes inbound data packet 312 to processing core 124(3) based on the selected inbound SA 130 and routes inbound data packet 316 to processing core 124(4) based on the selected inbound SA 132. As described above, these processing cores 124(3) and 124(4) decrypt the inbound data packets 312, 316 in accordance with IPsec and pass them on to the network resources 116. Consequently, these routings include SA context information for decryption purposes.

In various examples, the distribution module 120 can create and cache a flow table based on packet identifiers so that subsequent data packets in the same sequence, or same data flow (e.g., same destination and source IP addresses/ports), can be associated with the same SA and routed to the same processing core in the correct order. In this way, a lookup operation using the security association table 200 only needs to occur when the first data packet in a sequence is received (e.g., the initial outbound data packet is sent from network resources 116 to the remote device 110). Subsequent data packets can be correctly routed to a processing cores using the cached flow table. This provides an optimization because a flow table enables more efficient lookup operations compared to the security association table.

The techniques described above improve the throughput of a VPN connection. Moreover, the techniques can be implemented to make a runtime load balancing decision when a particular processing core is over utilized when compared to other available processing cores. For instance, a decision can be made to create additional SAs when additional processing cores are available for use. In this way, data traffic can be distributed across more processing cores.

Figure 4:
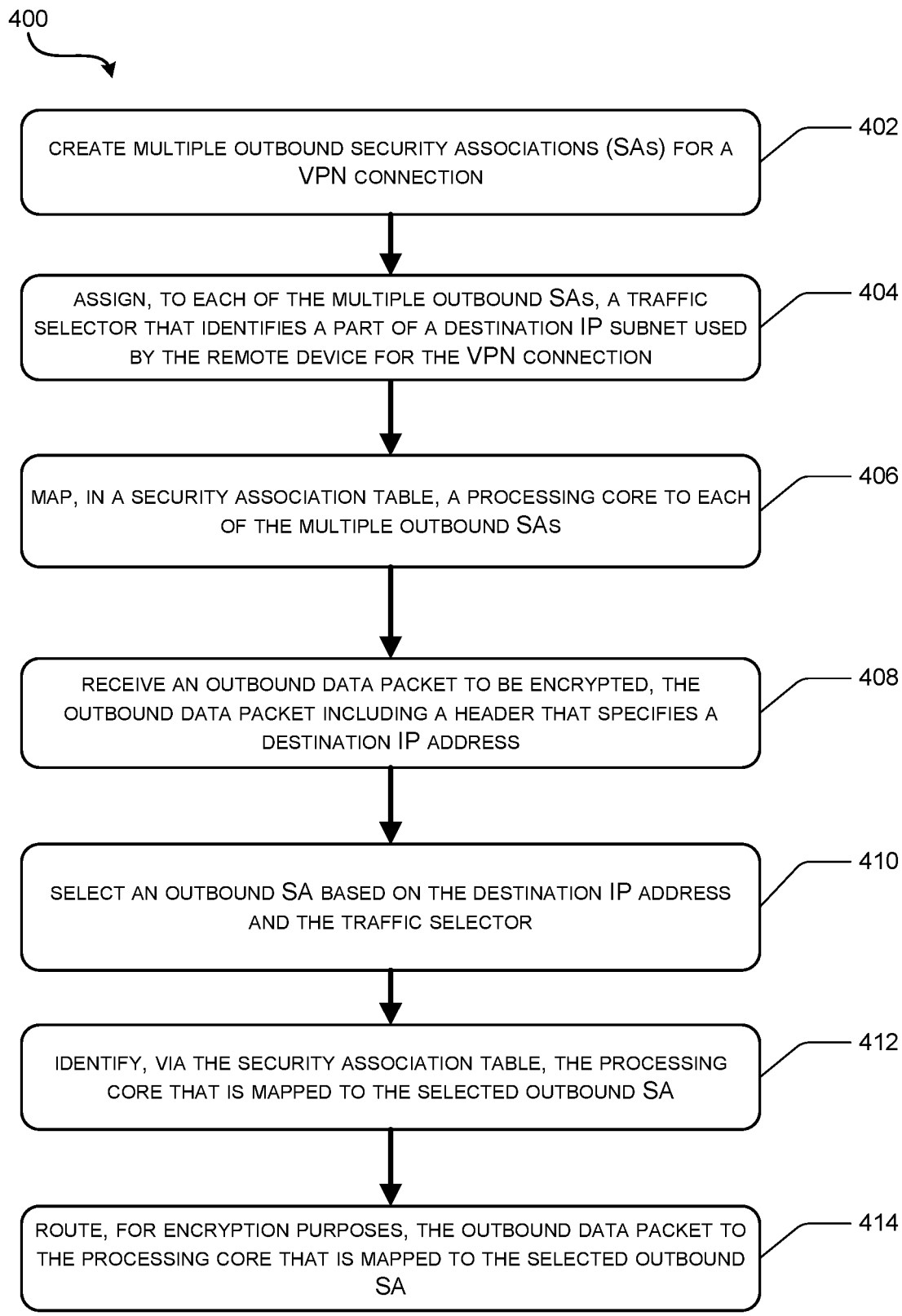
FIG. 4 is a flow diagram illustrating aspects of a sample routine that routes an outbound data packet to one of multiple processing cores.
Figure 5:
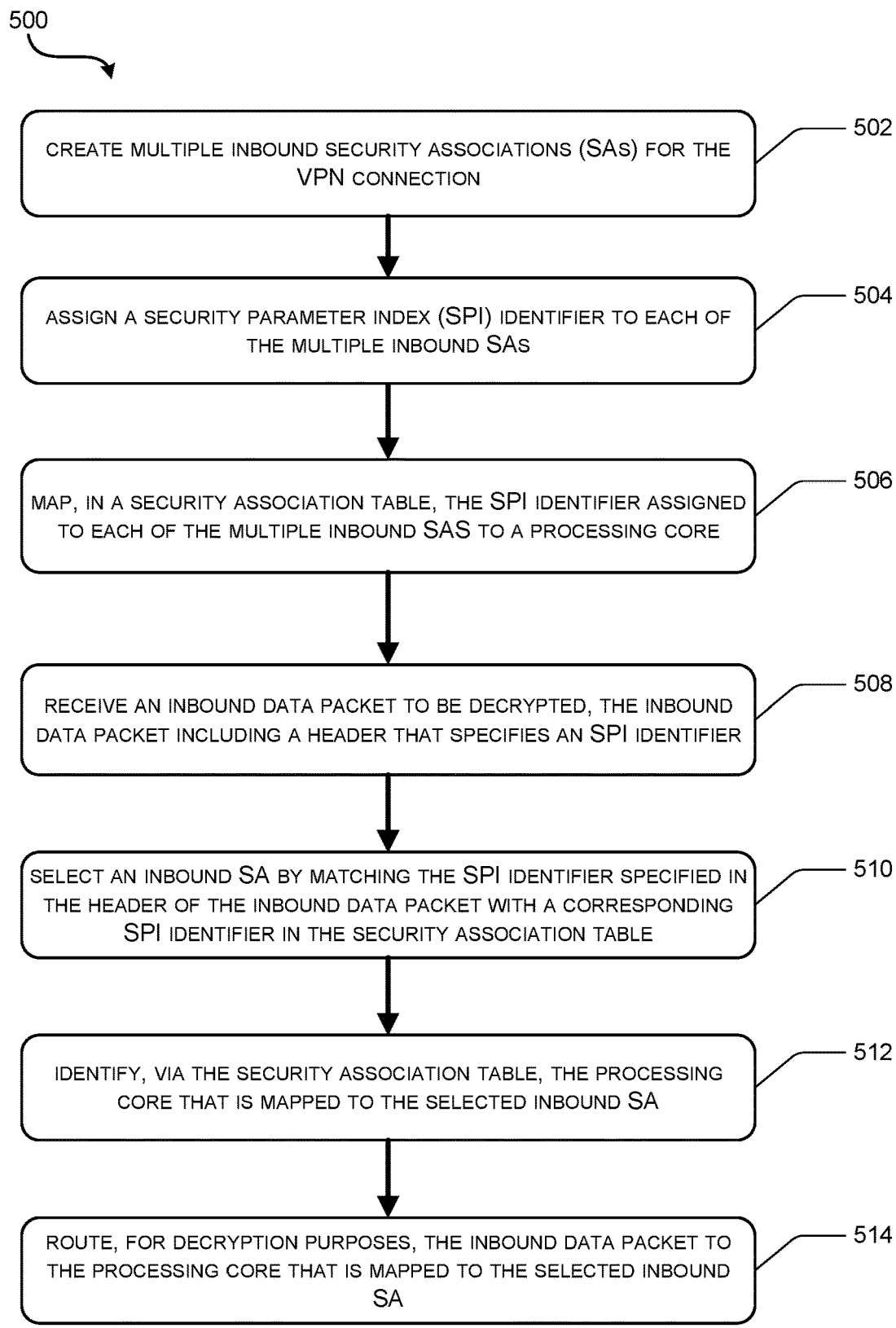
FIG. 5 is a flow diagram illustrating aspects of a sample routine that routes an inbound data packet to one of multiple processing cores.

FIGS. 4 and 5 are flow diagrams illustrating routines describing aspects of the present disclosure. In various examples, operations of the routines can be performed by components of the VPN gateway (e.g., the server instance, the distribution module configured on a server of the VPN gateway, etc.). The logical operations described herein with regards to FIGS. 4 and 5 can be implemented (1) as a sequence of computer implemented acts or program modules running on a computing device and/or (2) as interconnected machine logic circuits or circuit modules within a computing device.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations of the routines can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustrations may refer to components of the figures, it can be appreciated that the operations of the routines may be also implemented in many other ways. For example, the routines may be implemented, at least in part, by another remote computer, processor, or circuit. In the examples described herein, one or more modules of a computing system can receive and/or process the data. Any service, circuit, or application suitable for providing the techniques disclosed herein can be used in the operations described.

With reference to FIG. 4, the routine 400 begins at operation 402 where multiple outbound security associations (SAs) are created for a VPN connection. At operation 404, a traffic selector is assigned to each of the multiple outbound SAs. The traffic selector identifies a part of a destination IP subnet used by a remote device for the VPN connection and maps the part of the destination IP subnet to a source IP subnet or part of a source IP subnet.

At operation 406, a processing core is mapped, in a security association table, to each of the multiple outbound SAs. As described above, the security association table may be created when the VPN connection is established. At operation 408, an outbound data packet to be encrypted is received. As described above, the outbound data packet includes a header that specifies a destination IP address.

At operation 410, an outbound SA is selected based on the destination IP address and a traffic selector. That is, the VPN gateway is configured to match the destination IP address specified in the header of the outbound data packet with a corresponding part of the destination IP subnet identified via the traffic selector assigned to the selected outbound SA. The security association table may be used to find this match.

At operation 412, the security association table is used to identify the processing core that is mapped to the selected outbound SA. Finally, at operation 414, the outbound data packet is routed to the processing core that is mapped to the selected outbound SA, so that the outbound data packet can be encrypted.

With reference to FIG. 5, the routine 500 begins at operation 502 where multiple inbound security associations (SAs) are created for a VPN connection. At operation 504, a security parameter index (SPI) identifier is assigned to each of the multiple inbound SAs. At operation 506, the SPI identifier assigned to each of the multiple inbound SAs is mapped, in a security association table, to a processing core.

At operation 508, an inbound data packet to be decrypted is received. As described above, the inbound data packet includes a header that specifies an SPI identifier. At operation 510, an inbound SA is selected by matching the SPI identifier specified in the header of the inbound data packet with a corresponding SPI identifier in the security association table.

At operation 512, the processing core that is mapped to the selected inbound SA is identified using the security association table. Finally, at operation 514, the inbound data packet is routed to the processing core that is mapped to the selected inbound SA, so that the inbound data packet can be decrypted.

Figure 6:
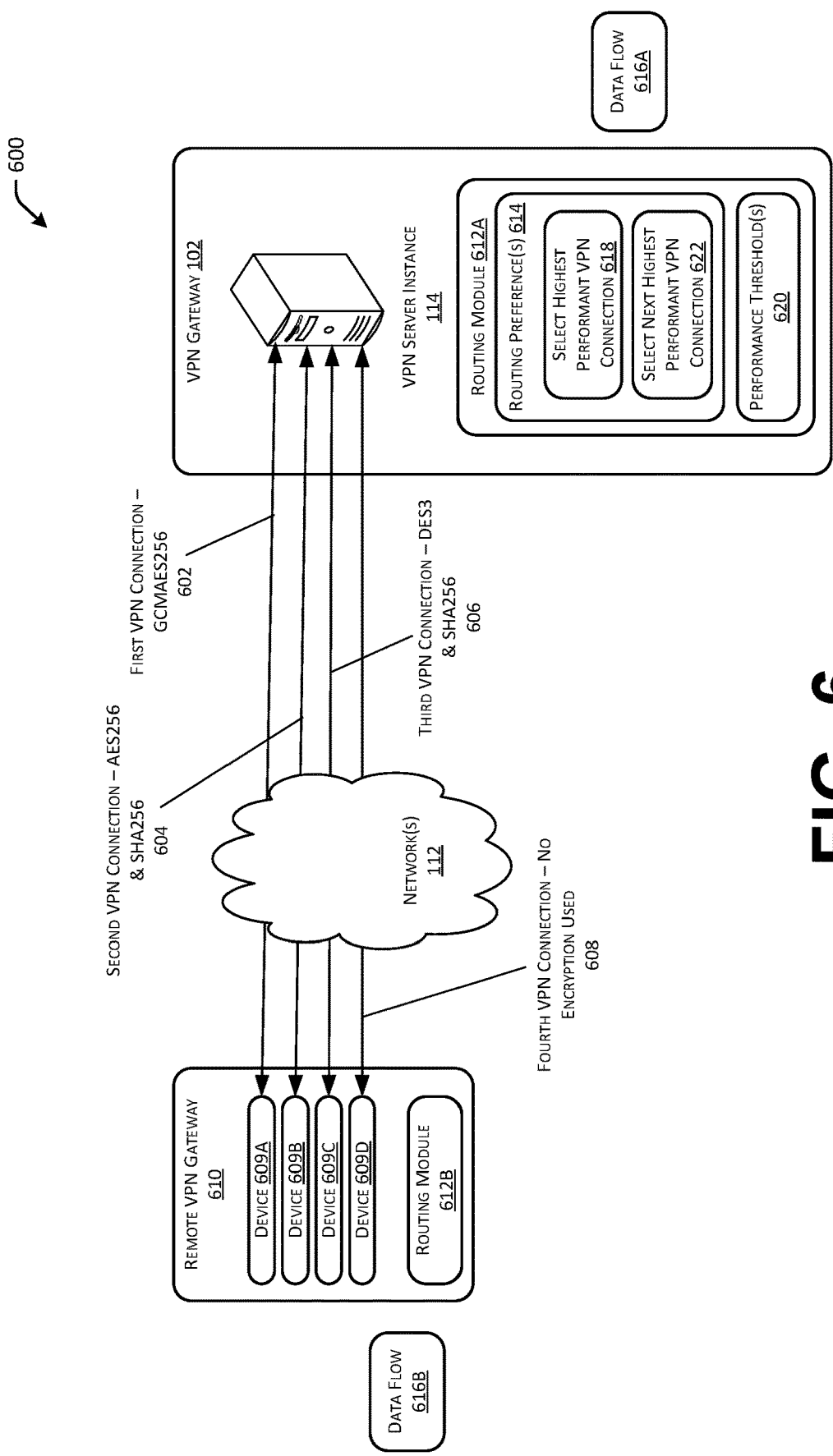
FIG. 6 illustrates an example environment in which a network VPN gateway can further improve throughput based on a routing preference configured to select a VPN connection with the highest throughput as a result of a cryptographic algorithm used to encrypt and decrypt data packets of a data flow.

FIG. 6 illustrates an example environment 600 in which the VPN gateway 102 (e.g., a network VPN gateway) can further improve throughput based on a routing preference configured to select a VPN connection with the highest throughput as a result of a cryptographic algorithm used to encrypt and decrypt data packets of a data flow. The VPN gateway 102 can be configured to establish multiple VPN connections 602, 604, 606, 608 with various endpoints (e.g., devices 609A-D such as servers) that comprise a remote VPN gateway 610 associated with a remote network (e.g., an enterprise network). While the number of VPN connections in this example is four, it is understood that more or less than four VPN connections can be established between the remote VPN gateway 610 and the VPN gateway 102.

The VPN gateway 102 and/or the remote VPN gateway 610 may measure throughput in megabytes per second (Mbps). The VPN gateway 102 and/or the remote VPN gateway 610 is configured to assign different cryptographic algorithms to the multiple VPN connections 602, 604, 606, 608. These different cryptographic algorithms provide different levels of security, but they also have different performance requirements. As illustrated in FIG. 6, the first VPN connection 602 uses a highly performant cryptographic algorithm (e.g., GCMAES256—that provides throughput at ~650 Mbps), the second VPN connection 604 uses a less-performant cryptographic algorithm (e.g., AES256 & SHA256—that provides throughput at ~500 Mbps) compared to the one used by the first VPN connection 602, the third VPN connection 606 uses an even less-performant cryptographic algorithm (e.g., DES3 & SHA256—that provides throughput at ~120 Mbps) compared to the ones used by the first VPN connection 602 and the second VPN connection 604, and the fourth VPN connection 608 uses no encryption (e.g., a cryptographic algorithm is not used because data transferred over this VPN tunnel is required to be encrypted already). Looking at the examples illustrated in FIG. 6, the AES256 & SHA256 cryptographic algorithm and the DES3 & SHA256 cryptographic algorithm require more CPU cycles compared to the GCMAES256 cryptographic algorithm, and these extra CPU cycles have a negative effect on the throughput provided by the associated VPN connection.

The VPN gateway 102 and/or the remote VPN gateway 610 can include respective routing modules 612A, 612B.

Routing module 612B may execute on individual ones of devices 609A-D, or a separate network gateway device. Accordingly, a routing module 612A, 612B uses a routing preference 614 that selects, for a data flow 616A, 616B to be exchanged, the first VPN connection 602 because it uses a cryptographic algorithm that provides the best, or highest, performance with respect to throughput 618.

The routing module 612A, 612B is further configured to monitor, periodically or in real-time, the performance of the VPN connections 602, 604, 606, 608. In various examples, the routing preference 614 is valid as long as the first VPN connection 602 is not overloaded and suffering from performance issues. For example, a performance issue may arise if a performance measurement no longer satisfies a performance threshold 620 pre-established for a particular performance factor. More specifically, the routing preference 614 may be valid as long as a latency measurement for the first VPN connection 602 satisfies (e.g., is below) a pre-established threshold latency value. In another example, the routing preference 614 may be valid as long as a packet loss measurement for the first VPN connection 602 satisfies (e.g., is below) a pre-established threshold packet loss value. In yet another example, the routing preference 614 may be valid as long as a jitter measurement for the first VPN connection 602 satisfies (e.g., is below) a pre-established threshold jitter measurement. Performance factors such as latency, packet loss, and jitter can affect the throughput of a VPN connection. To this end, the routing module 612A, 612B may also monitor and measure the throughput itself to determine that the routing preference 614 is still valid, e.g., a throughput measurement for the first VPN connection 102 satisfies (e.g., is above) a pre-established threshold throughput measurement.

If the performance of the preferred and highest-performant VPN connection 602 suffers enough (e.g., the performance threshold(s) 620 are no longer satisfied) due to the amount of data traffic being communicated or other reasons, then the routing module 612A, 612B can change the routing preference 614 to route new data flows to the other VPN connections that use less performant cryptographic algorithms compared to the one used by the first VPN connection 602. For example, the routing preference 614 can be updated to select the next highest performant VPN connection 622, which is the second VPN connection 604 in the example of FIG. 6. This update may be temporary in the sense that the routing preference 614 may switch back to the first VPN connection 602 that provides the highest performance 618 once the first VPN connection 602 comes back into compliance with the performance threshold(s) 620. Consequently, the VPN gateways 102, 610 are configured to monitor the performance of the VPN connections, particularly the highest performant one, to ensure that it is acceptable to continue to route new data flows.

To help avoid overload situations, data packets (e.g., headers) of a data flow 616A, 616V can be examined by the routing module 612A, 612B to determine if the data packets are already encrypted. If the data packets are already encrypted, another routing preference can route the encrypted data flow to a VPN connection that performs no further encryption (e.g., VPN connection 608 in the example of FIG. 6). This will further increase the throughput.

Figure 7:
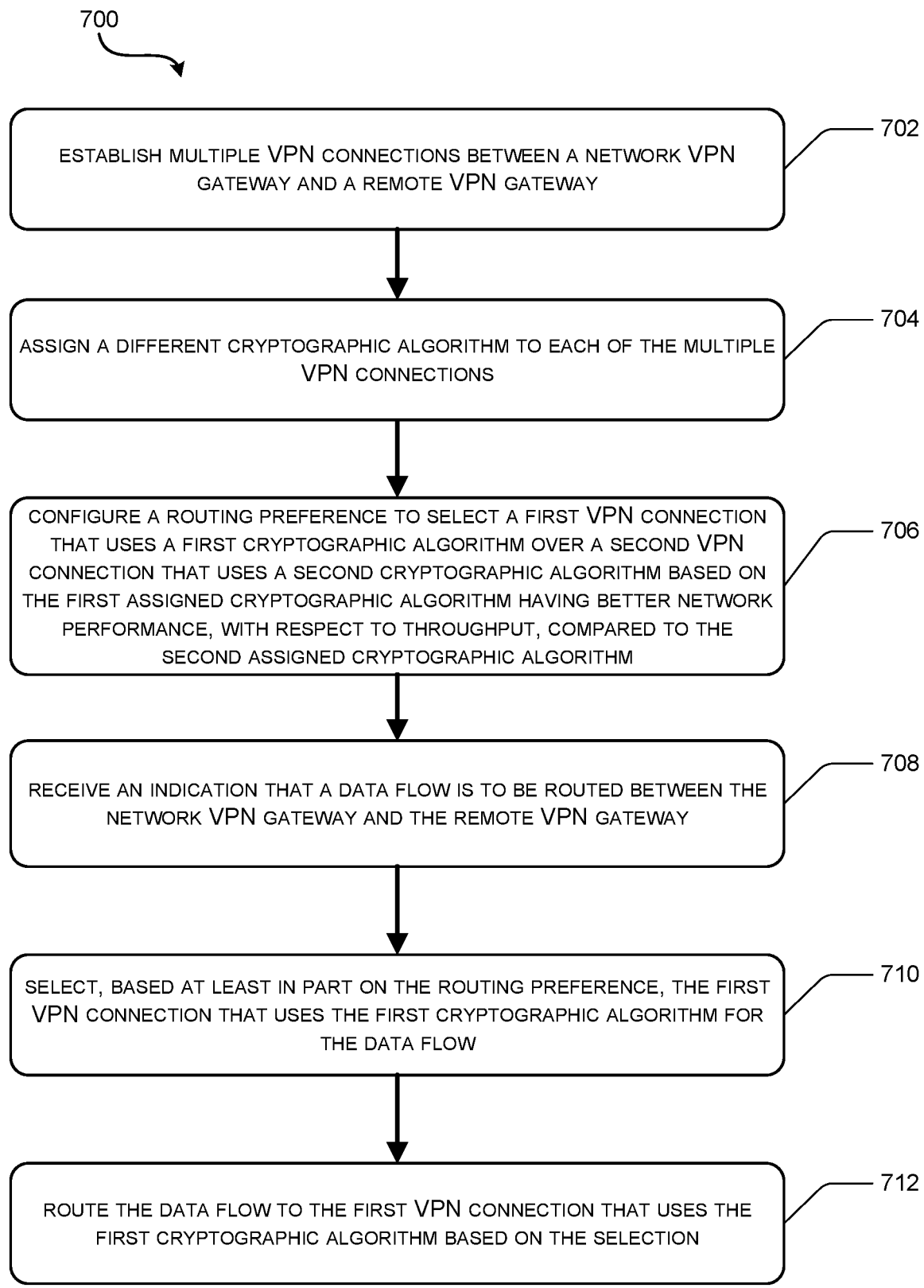
FIG. 7 is a flow diagram illustrating aspects of a sample routine that uses a routing preference configured to select a VPN connection with the highest throughput as a result of a cryptographic algorithm used to encrypt and decrypt data packets of a data flow.
Figure 8:
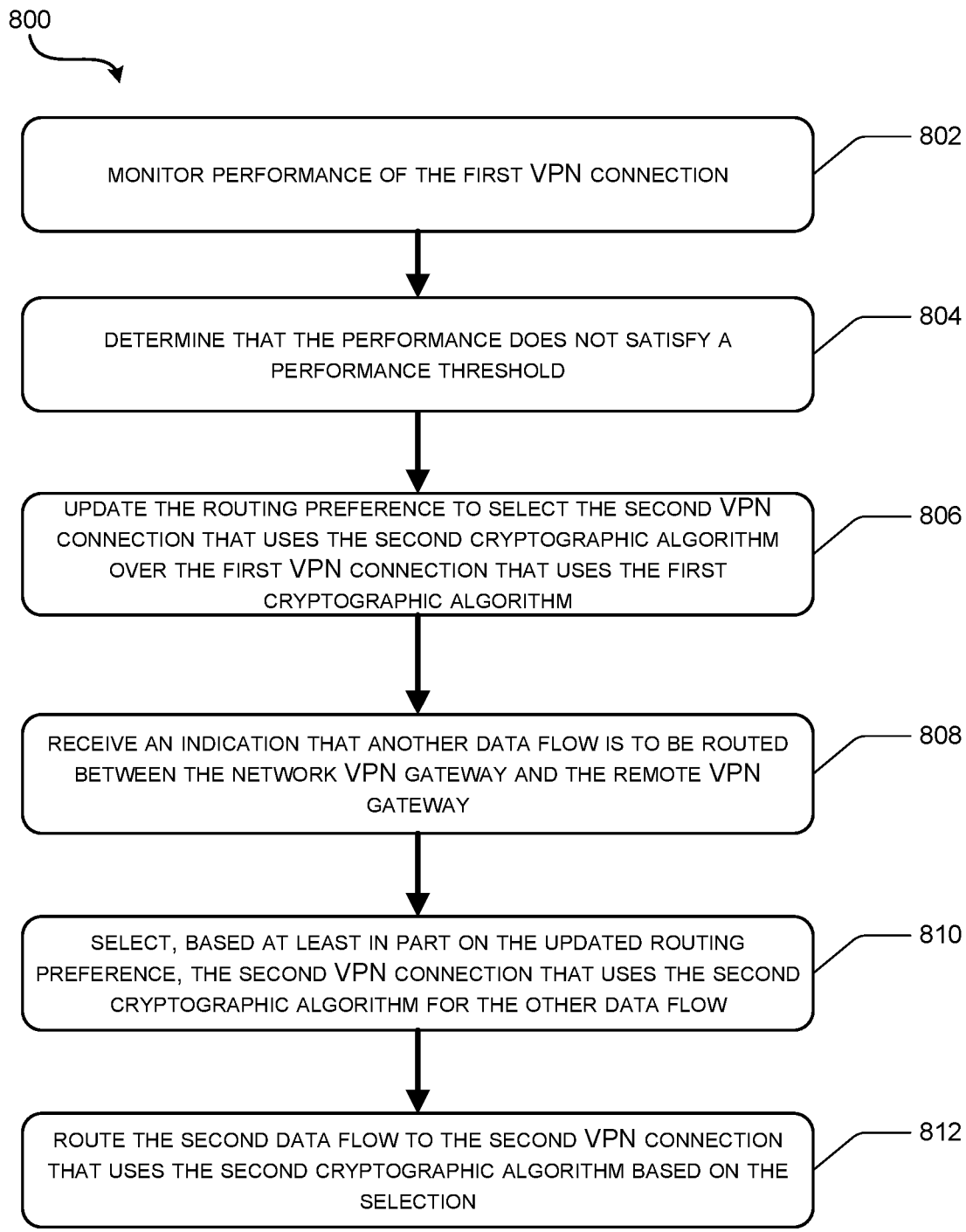
FIG. 8 is a flow diagram illustrating aspects of a sample routine that updates the routing preference based on monitored performance.

FIGS. 7 and 8 are flow diagrams illustrating routines describing aspects of the present disclosure. In various examples, operations of the routines can be performed by components of a remote and/or a network VPN gateway. The logical operations described herein with regards to FIGS. 7 and 8 can be implemented (1) as a sequence of computer implemented acts or program modules running on a computing device and/or (2) as interconnected machine logic circuits or circuit modules within a computing device.

With reference to FIG. 7, the routine 700 begins at operation 702 where multiple VPN connections are established between a network VPN gateway and a remote VPN gateway. At operation 704, a different cryptographic algorithm is assigned to each of the multiple VPN connections.

Moving on to operation 706, a routing preference is configured. The routing preference selects a first VPN connection that uses a first assigned cryptographic algorithm over a second VPN connection that uses a second assigned cryptographic algorithm based on the first assigned cryptographic algorithm having better network performance, with respect to throughput, compared to the second assigned cryptographic algorithm.

At operation 708, an indication that a data flow is to be routed between the network VPN gateway and the remote VPN gateway is received. Then, at operation 710, a selection of the first VPN connection is made for the data flow based on the routing preference. Finally, at operation 712, the data flow is routed to the first VPN connection that uses the first assigned cryptographic algorithm based on the selection.

With reference to FIG. 8, the routine 800 begins at operation 802 where the performance of the first VPN connection is monitored. At operation 804, it is determined that the performance does not satisfy a performance threshold. Then at operation 806, the routing preference is updated to select the second VPN connection that uses the second assigned cryptographic algorithm over the first VPN connection that uses the first assigned cryptographic algorithm, because the first VPN connection is experiencing performance issues.

At operation 808, an indication that another data flow is to be routed between the network VPN gateway and the remote VPN gateway is received. At operation 810, the second VPN connection that uses the second assigned cryptographic algorithm is selected for the other data flow based on the updated routing preference. Finally, at operation 812, the second data flow is routed to the second VPN connection that uses the second assigned cryptographic algorithm based on the selection.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

Figure 9:
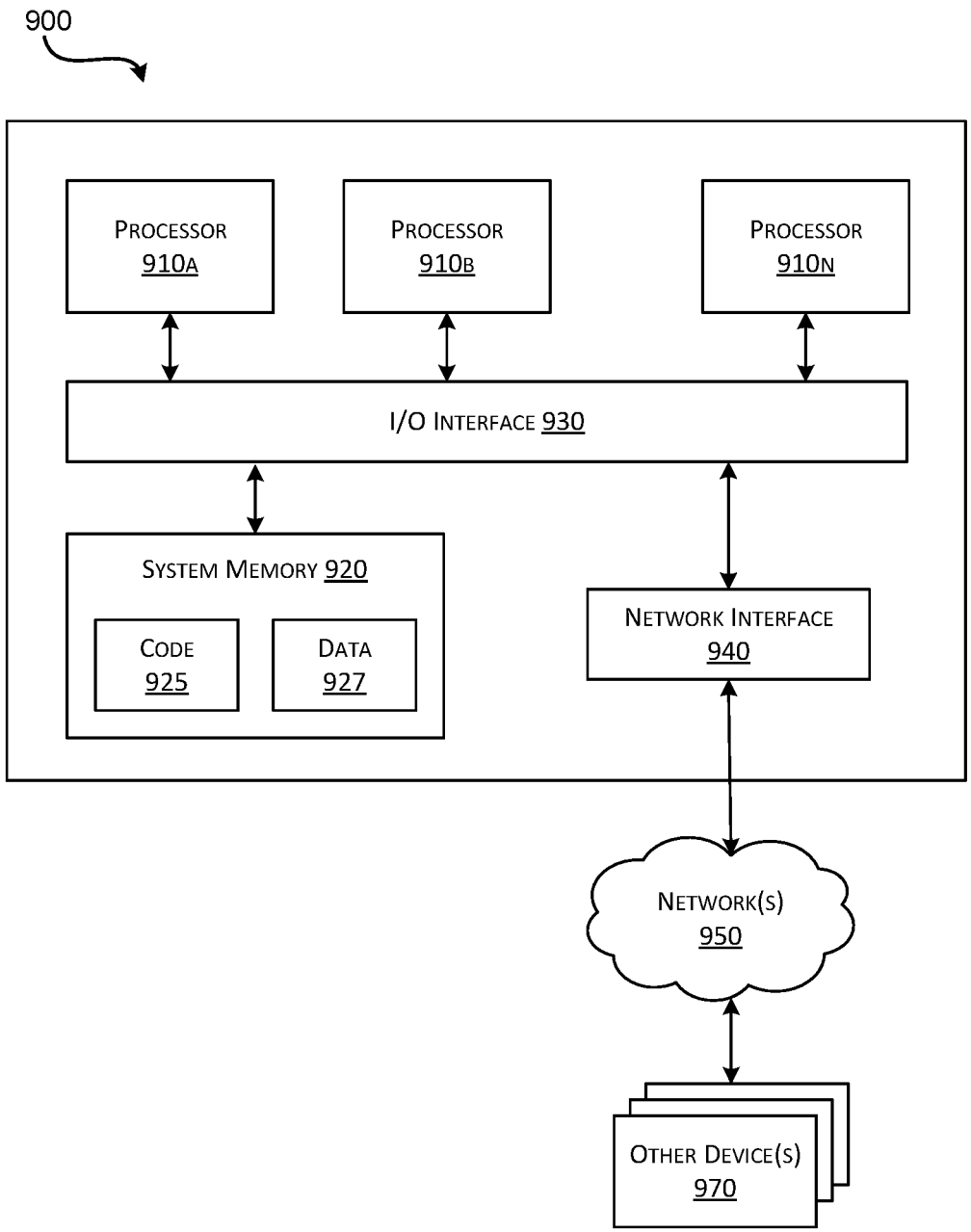
FIG. 9 is an example computing system capable of implementing the techniques of the present disclosure.

FIG. 9 illustrates a general-purpose computing device 900. In various examples, device 900 can be a server computer or any other sort of computing device that can serve as a physical host or other sort of computing device in a VPN gateway. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 930. Computing device 900 further includes a network interface 940 coupled to the I/O interface 930. In various embodiments, the processors 910 can be the processing cores described above.

In various embodiments, computing device 900 may be a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x77, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 710. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those routines, techniques and data described above, are shown stored within system memory 920 as code 925 and data 927.

In one embodiment, the I/O interface 930 may be configured to coordinate I/O traffic between the processor 910, system memory 920, and any peripheral devices in the device, including network interface 940 or other peripheral interfaces. In some embodiments, the I/O interface 930 may perform any necessary protocol, timing, or other data transformations to convert data signals from one component (e.g., system memory 920) into a format suitable for use by another component (e.g., processor 910). In some embodiments, the I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. Also, in some embodiments some or all of the functionality of the I/O interface 930, such as an interface to system memory 920, may be incorporated directly into processor 910.

Network interface 940 may be configured to allow data to be exchanged between computing device 900 and other device or devices 970 attached to a network or network(s) 950, such as other computer systems or components illustrated in FIGS. 1-3 and 6, for example. In various embodiments, network interface 940 may support communication via any suitable wired or wireless general data networks. Additionally, network interface 940 may support communication via telecommunications/telephony networks such as analog voice networks or digital fiber communications networks, via storage area networks such as Fibre Channel SANs or via any other suitable type of network and/or protocol.

Network(s) 950 (e.g., networks 112) may include, for example, public networks such as the Internet, private networks such as an institutional and/or personal intranet, or some combination of private and public networks. Network(s) 950 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G and so forth) or any combination thereof. Network(s) 950 may utilize communications protocols, including packet-based and/or datagram-based protocols such as Internet protocol ("IP"), transmission control protocol ("TCP"), user datagram protocol ("UDP"), or other types of protocols. Moreover, network(s) 950 may also include a number of devices that facilitate network communications and/or form a hardware basis for the networks, such as switches, routers, gateways, access points, firewalls, base stations, repeaters, backbone devices, and the like.

In some embodiments, system memory 920 may be one embodiment of a computer-accessible medium configured to store program instructions and data as described above for FIGS. 1-8. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940.

Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "system" and/or "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses.

Example Clause A, a method of improving throughput for data traffic to be communicated via a virtual private network (VPN), comprising: establishing multiple VPN connections between a network VPN gateway and a remote VPN gateway; assigning a different cryptographic algorithm to each of the multiple VPN connections; configuring, by one or more processors, a routing preference to select a first VPN connection that uses a first assigned cryptographic algorithm over a second VPN connection that uses a second assigned cryptographic algorithm based on the first assigned cryptographic algorithm having better network performance, with respect to throughput, compared to the second assigned cryptographic algorithm; receiving an indication that a data flow is to be routed between the network VPN gateway and the remote VPN gateway; selecting, based at least in part on the routing preference, the first VPN connection that uses the first assigned cryptographic algorithm for the data flow; and routing the data flow to the first VPN connection that uses the first assigned cryptographic algorithm based on the selection.

Example Clause B, the method of Example Clause A, further comprising: monitoring performance of the first VPN connection; determining that the performance does not satisfy a performance threshold; in response to determining that the performance does not satisfy the performance threshold, updating the routing preference to select the second VPN connection that uses the second assigned cryptographic algorithm over the first VPN connection that uses the first assigned cryptographic algorithm; receiving an indication that another data flow is to be routed between the network VPN gateway and the remote VPN gateway; selecting, based at least in part on the updated routing preference, the second VPN connection that uses the second assigned cryptographic algorithm for the other data flow; and routing the second data flow to the second VPN connection that uses the second assigned cryptographic algorithm based on the selection.

Example Clause C, the method of Example Clause B, wherein the performance is monitored with respect to latency.

Example Clause D, the method of Example Clause B, wherein the performance is monitored with respect to packet loss.

Example Clause E, the method of Example Clause B, wherein the performance is monitored with respect to jitter.

Example Clause F, the method of Example Clause B, wherein the performance is monitored with respect to throughput.

Example Clause G, the method of any one of Example Clauses A through F, wherein the first assigned cryptographic algorithm is GCMAES256 and the second assigned cryptographic algorithm is one of (i) AES256 & SHA256 or (ii) DES3 & SHA256.

Example Clause H, the method of any one of Example Clauses A through F, wherein the first assigned cryptographic algorithm is AES256 & SHA256 and the second assigned cryptographic algorithm is DES3 & SHA256.

Example Clause I, the method of any one of Example Clauses A through H, further comprising: determining that another data flow to be routed between the network VPN gateway and the remote VPN gateway is already encrypted; and based on the other data flow already being encrypted, selecting a third VPN connection that does not use a cryptographic algorithm.

Example Clause J, a system for improving throughput for data traffic to be communicated via a virtual private network (VPN), the system comprising: one or more processors; and computer storage media having executable instructions that, when executed by the one or more processors, cause the system to perform operations comprising: establishing multiple VPN connections between a network VPN gateway and a remote VPN gateway; assigning a different cryptographic algorithm to each of the multiple VPN connections; configuring a routing preference to select a first VPN connection that uses a first assigned cryptographic algorithm over a second VPN connection that uses a second assigned cryptographic algorithm based on the first assigned cryptographic algorithm having better network performance, with respect to throughput, compared to the second assigned cryptographic algorithm; receiving an indication that a data flow is to be routed between the network VPN gateway and the remote VPN gateway; selecting, based at least in part on the routing preference, the first VPN connection that uses the first assigned cryptographic algorithm for the data flow; and routing the data flow to the first VPN connection that uses the first assigned cryptographic algorithm based on the selection.

Example Clause K, the system of Example Clause J, wherein the operations further comprise: monitoring performance of the first VPN connection; determining that the performance does not satisfy a performance threshold; in response to determining that the performance does not satisfy the performance threshold, updating the routing preference to select the second VPN connection that uses the second assigned cryptographic algorithm over the first VPN connection that uses the first assigned cryptographic algorithm; receiving an indication that another data flow is to be routed between the network VPN gateway and the remote VPN gateway; selecting, based at least in part on the updated routing preference, the second VPN connection that uses the second assigned cryptographic algorithm for the other data flow; and routing the second data flow to the second VPN connection that uses the second assigned cryptographic algorithm based on the selection.

Example Clause L, the system of Example Clause K, wherein the performance is monitored with respect to latency.

Example Clause M, the system of Example Clause K, wherein the performance is monitored with respect to packet loss.

Example Clause N, the system of Example Clause K, wherein the performance is monitored with respect to jitter.

Example Clause O, the system of Example Clause K, wherein the performance is monitored with respect to throughput.

Example Clause P, the system of any one of Example Clauses J through O, wherein the first assigned cryptographic algorithm is GCMAES256 and the second assigned cryptographic algorithm is one of (i) AES256 & SHA256 or (ii) DES3 & SHA256.

Example Clause Q, the system of any one of Example Clauses J through O, wherein the first assigned cryptographic algorithm is AES256 & SHA256 and the second assigned cryptographic algorithm is DES3 & SHA256.

Example Clause R, the system of any one of Example Clauses J through Q, wherein the operations further comprise: determining that another data flow to be routed between the network VPN gateway and the remote VPN gateway is already encrypted; and based on the other data flow already being encrypted, selecting a third VPN connection that does not use a cryptographic algorithm.

Example Clause S, one or more computer storage media having executable instructions that, when executed by one or more processors, cause a system to perform operations comprising: establishing multiple VPN connections between a network VPN gateway and a remote VPN gateway; assigning a different cryptographic algorithm to each of the multiple VPN connections; configuring a routing preference to select a first VPN connection that uses a first assigned cryptographic algorithm over a second VPN connection that uses a second assigned cryptographic algorithm based on the first assigned cryptographic algorithm having better network performance, with respect to throughput, compared to the second assigned cryptographic algorithm; receiving an indication that a data flow is to be routed between the network VPN gateway and the remote VPN gateway; selecting, based at least in part on the routing preference, the first VPN connection that uses the first assigned cryptographic algorithm for the data flow; and routing the data flow to the first VPN connection that uses the first assigned cryptographic algorithm based on the selection.

Example Clause T, the one or more computer storage media of Example Clause S, wherein the operations further comprise: monitoring performance of the first VPN connection; determining that the performance does not satisfy a performance threshold; in response to determining that the performance does not satisfy the performance threshold, updating the routing preference to select the second VPN connection that uses the second assigned cryptographic algorithm over the first VPN connection that uses the first assigned cryptographic algorithm; receiving an indication that another data flow is to be routed between the network VPN gateway and the remote VPN gateway; selecting, based at least in part on the updated routing preference, the second VPN connection that uses the second assigned cryptographic algorithm for the other data flow; and routing the second data flow to the second VPN connection that uses the second assigned cryptographic algorithm based on the selection.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different cryptographic algorithms, two different VPN connections, etc.).

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method of improving throughput for data traffic to be communicated via a virtual private network (VPN), comprising:
   establishing multiple VPN connections between a network VPN gateway and a remote VPN gateway;
   assigning a different cryptographic algorithm to each of the multiple VPN connections;
   configuring, by one or more processors, a routing preference to selectively choose a first VPN connection that uses a first assigned cryptographic algorithm that has better network performance, with respect to throughput, compared to a second assigned cryptographic algorithm used by a second VPN connection;
   receiving an indication that a data flow is to be routed between the network VPN gateway and the remote VPN gateway;
   selecting, based at least in part on the routing preference and for the data flow, the first VPN connection that uses the first assigned cryptographic algorithm over the second VPN that uses the second assigned cryptographic algorithm; and
   routing the data flow to the first VPN connection that uses the first assigned cryptographic algorithm based on the selection.

2. The method of claim 1, further comprising:
   monitoring performance of the first VPN connection with respect to a number of data flows routed to the first VPN connection via the routing preference;
   determining that the performance does not satisfy a performance threshold due to the number of data flows routed to the first VPN connection via the routing preference;
   in response to determining that the performance does not satisfy the performance threshold, updating the routing preference to select the second VPN connection that uses the second assigned cryptographic algorithm over the first VPN connection that uses the first assigned cryptographic algorithm;
   receiving an indication that another data flow is to be routed between the network VPN gateway and the remote VPN gateway;
   selecting, based at least in part on the updated routing preference, the second VPN connection that uses the second assigned cryptographic algorithm for the other data flow; and
   routing the second data flow to the second VPN connection that uses the second assigned cryptographic algorithm based on the selection.

3. The method of claim 2, wherein the performance is monitored with respect to latency.

4. The method of claim 2, wherein the performance is monitored with respect to packet loss.

5. The method of claim 2, wherein the performance is monitored with respect to jitter.

6. The method of claim 2, wherein the performance is monitored with respect to throughput.

7. The method of claim 1, wherein the first assigned cryptographic algorithm is GCMAES256 and the second assigned cryptographic algorithm is one of (i) AES256 & SHA256 or (ii) DES3 & SHA256.

8. The method of claim 1, wherein the first assigned cryptographic algorithm is AES256 & SHA256 and the second assigned cryptographic algorithm is DES3 & SHA256.

9. The method of claim 1, further comprising:
   determining that another data flow to be routed between the network VPN gateway and the remote VPN gateway is already encrypted; and
   based on the other data flow already being encrypted, selecting a third VPN connection that does not use a cryptographic algorithm.

10. A system for improving throughput for data traffic to be communicated via a virtual private network (VPN), the system comprising:
    one or more processors; and
    computer storage media having executable instructions that, when executed by the one or more processors, cause the system to perform operations comprising:
      establishing multiple VPN connections between a network VPN gateway and a remote VPN gateway;
      assigning a different cryptographic algorithm to each of the multiple VPN connections;
      configuring a routing preference to selectively choose a first VPN connection that uses a first assigned cryptographic algorithm that has better network performance, with respect to throughput, compared to a second assigned cryptographic algorithm used by a second VPN connection;
      receiving an indication that a data flow is to be routed between the network VPN gateway and the remote VPN gateway;
      selecting, based at least in part on the routing preference and for the data flow, the first VPN connection that uses the first assigned cryptographic algorithm over the second VPN that uses the second assigned cryptographic algorithm; and
      routing the data flow to the first VPN connection that uses the first assigned cryptographic algorithm based on the selection.

11. The system of claim 10, wherein the operations further comprise:
    monitoring performance of the first VPN connection with respect to a number of data flows routed to the first VPN connection via the routing preference;
    determining that the performance does not satisfy a performance threshold due to the number of data flows routed to the first VPN connection via the routing preference;
    in response to determining that the performance does not satisfy the performance threshold, updating the routing preference to select the second VPN connection that uses the second assigned cryptographic algorithm over the first VPN connection that uses the first assigned cryptographic algorithm;
    receiving an indication that another data flow is to be routed between the network VPN gateway and the remote VPN gateway;
    selecting, based at least in part on the updated routing preference, the second VPN connection that uses the second assigned cryptographic algorithm for the other data flow; and
    routing the second data flow to the second VPN connection that uses the second assigned cryptographic algorithm based on the selection.

12. The system of claim 11, wherein the performance is monitored with respect to latency.

13. The system of claim 11, wherein the performance is monitored with respect to packet loss.

14. The system of claim 11, wherein the performance is monitored with respect to jitter.

15. The system of claim 11, wherein the performance is monitored with respect to throughput.

16. The system of claim 10, wherein the first assigned cryptographic algorithm is GCMAES256 and the second assigned cryptographic algorithm is one of (i) AES256 & SHA256 or (ii) DES3 & SHA256.

17. The system of claim 10, wherein the first assigned cryptographic algorithm is AES256 & SHA256 and the second assigned cryptographic algorithm is DES3 & SHA256.

18. The system of claim 10, wherein the operations further comprise:
   determining that another data flow to be routed between the network VPN gateway and the remote VPN gateway is already encrypted; and
   based on the other data flow already being encrypted, selecting a third VPN connection that does not use a cryptographic algorithm.

19. One or more computer storage media having executable instructions that, when executed by one or more processors, cause a system to perform operations comprising:
   establishing multiple VPN connections between a network VPN gateway and a remote VPN gateway;
   assigning a different cryptographic algorithm to each of the multiple VPN connections;
   configuring a routing preference to selectively choose a first VPN connection that uses a first assigned cryptographic algorithm that has better network performance, with respect to throughput, compared to a second assigned cryptographic algorithm used by a second VPN connection;
   receiving an indication that a data flow is to be routed between the network VPN gateway and the remote VPN gateway;
   selecting, based at least in part on the routing preference and for the data flow, the first VPN connection that uses the first assigned cryptographic algorithm over the second VPN that uses the second assigned cryptographic algorithm; and
   routing the data flow to the first VPN connection that uses the first assigned cryptographic algorithm based on the selection.

20. The one or more computer storage media of claim 19, wherein the operations further comprise:
   monitoring performance of the first VPN connection with respect to a number of data flows routed to the first VPN connection via the routing preference;
   determining that the performance does not satisfy a performance threshold due to the number of data flows routed to the first VPN connection via the routing preference;
   in response to determining that the performance does not satisfy the performance threshold, updating the routing preference to select the second VPN connection that uses the second assigned cryptographic algorithm over the first VPN connection that uses the first assigned cryptographic algorithm;
   receiving an indication that another data flow is to be routed between the network VPN gateway and the remote VPN gateway;
   selecting, based at least in part on the updated routing preference, the second VPN connection that uses the second assigned cryptographic algorithm for the other data flow; and
   routing the second data flow to the second VPN connection that uses the second assigned cryptographic algorithm based on the selection.

* * * * *